United States Patent
Fazzini (10) Patent No.: US 7,518,655 B2
(45) Date of Patent: *Apr. 14, 2009

(54) CONVERSION OF VIDEO DATA FROM INTERLACED TO NON-INTERLACED FORMAT

(75) Inventor: Paolo Giuseppe Fazzini, Watford (GB)

(73) Assignee: Imagination Technologies Limited, Hertfordshire (GB)

( * ) Notice: Subject to any disclaimer, the term of this patent is extended or adjusted under 35 U.S.C. 154(b) by 518 days.

This patent is subject to a terminal disclaimer.

(21) Appl. No.: 11/125,412

(22) Filed: May 9, 2005

(65) Prior Publication Data

US 2006/0181647 A1 Aug. 17, 2006

(30) Foreign Application Priority Data

Feb. 8, 2005 (GB) ................................. 0502598

(51) Int. Cl.
  *H04N 11/20* (2006.01)
  *H04N 7/01* (2006.01)
(52) U.S. Cl. ........................ 348/448; 348/458
(58) Field of Classification Search .......... 348/441–459
See application file for complete search history.

(56) References Cited

U.S. PATENT DOCUMENTS

| | | | |
|---|---|---|---|
| 5,485,224 A * | 1/1996 | Burns et al. .................. 348/699 |
| 5,532,751 A | 7/1996 | Lui | |
| 5,832,143 A | 11/1998 | Suga et al. | |
| 5,886,745 A | 3/1999 | Muraji et al. | |
| 6,133,957 A | 10/2000 | Campbell | |
| 2002/0196362 A1 | 12/2002 | Yang et al. | |
| 2004/0263685 A1 | 12/2004 | Song | |

FOREIGN PATENT DOCUMENTS

| | | |
|---|---|---|
| EP | 0 735 748 A2 | 10/1996 |
| EP | 0 735 748 A3 | 5/1997 |
| EP | 0 785 683 A2 | 7/1997 |
| GB | 2 402 288 A | 12/2004 |

OTHER PUBLICATIONS

International Search Report and Written Opinion mailed Nov. 13 2006 in International Appln. No. PCT/GB2006/000432.
Search Report dated May 17, 2005 in Great Britain Application No. 0502598.6 (1 page).
Combined Search and Examination Report dated May 18, 2005 in Great Britain Application No. 0502598.6 (2 pages).
U.S. Appl. No. 11/125,413, filed May 9, 2005, Inventor: Paolo Giuseppe Fazzini.
U.S. Appl. No. 11/125,416, filed May 9, 2005, Inventor: Paolo Giuseppe Fazzini.

* cited by examiner

*Primary Examiner*—M. Lee
(74) *Attorney, Agent, or Firm*—Flynn, Thiel, Boutell & Tanis, P.C.

(57) ABSTRACT

A method and apparatus are provided for converting an interlaced video signal to a progressive scan signal. For each pixel in each missing line of a video field providing correlation data for each of set of possible interpolations between adjacent pixels to the pixel to be reconstructed. A confidence measure is then derived from the correlation data and from that confidence measure the interpolation scheme most likely to produce an accurate missing pixel is determined. The missing pixel is then interpolated using the selected interpolation scheme. In this process, the step of deriving a confidence measure comprises determining the number of maxima and minima in the correlation data and deriving the confidence measure in dependence on the number of maxima and minima so determined.

12 Claims, 7 Drawing Sheets

CONVERSION OF VIDEO DATA FROM INTERLACED TO NON-INTERLACED FORMAT

BACKGROUND OF THE INVENTION

This invention relates to a method and apparatus for converting an interlaced video signal to the deinterlaced or progressive scan video signal, and in particular to a method and apparatus which provides appropriate control to the effectiveness of the conversion.

Broadcast television signals are usually provided in interlaced form. For example, the phase alternate line (PAL) system used in Europe is made up of video frames comprising two interlaced fields. Each field comprises alternate lines of the frame. Thus, when the signal is applied to a display the first field will be applied to the odd numbered lines of the display followed by the second field being applied to the even numbered lines of the display. The frame rate, the rate at which frames comprising two interlaced fields are applied to a display is usually 50 Hz.

Progressive scan displays interpolate within the fields of each frame and sometimes between adjacent fields to provide data for the missing lines in each field, thereby converting each field to a frame and doubling the effective frame rate of the display. One of the problems when interpolating the missing lines of video fields is that of accurate detection of edges or contours marking variations in the visible information. U.S. Pat. No. 5,532,751 looks at the variation between pixels which are used to interpolate missing pixels to detect edges or contours. If the variation is below a threshold, the orientation of an edge is estimated and a new pixel is formed from the average of the pixels lying along the estimated orientation. If the estimate of edge orientation is unsuccessful then a new pixel is formed from the average of two vertically aligned pixels within a field. This technique can generate artefacts in pictures which have two or more pairs of pixels with high resemblance.

An improvement upon this method is disclosed in U.S. Pat. No. 6,133,957. In this, the variation between pixels or a set of pixels is computed to reconstruct edges or borders. Two variations with the lowest values are used and a reconstructed pixel is generated as a weighted average of the pixels used in the chosen variations.

Still a further improvement is set out in British patent no. 2402288. The solution presented here preserves vertical frequencies present in a frame which is being deinterlaced when accurate information on the position of an edge or border is not available.

All the techniques described above fetch input data from one instant of time only and search for the best match in vertically adjacent lines of a video field. They are referred to here as border reconstructers (BR).

One of the fundamental ideas behind a BR is the estimation of the correlation between two sets of pixels belonging to two vertically adjacent lines in a field at an instant of time.

Figure 1:
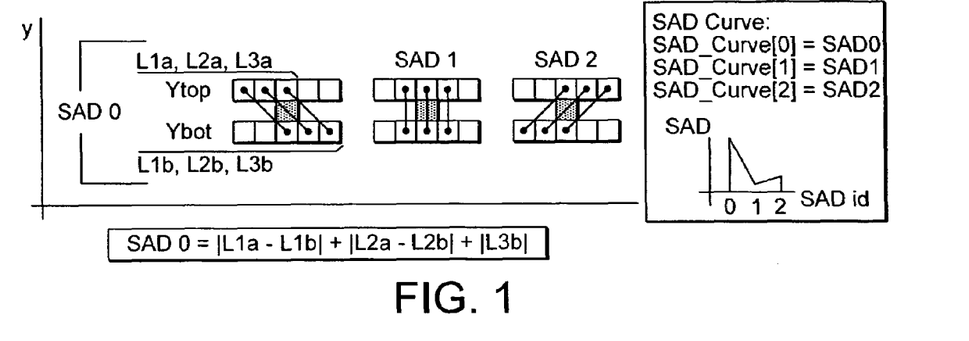
FIG. 1 shows schematically the type of SAD analysis which is made when interpolating missing pixels in converting interlaced video signals to progressive scan signals.

FIG. 1 shows three representations of short sections of two adjacent lines in a video field. In the example given in FIG. 1, we see only the lines from the current field being used although one or more adjacent fields can also contribute to the interpolation used to the derivation of pixel data for the missing lines as can additional lines in the current field.

In FIG. 1, three different possible interpolations schemes are shown and correlations are evaluated for these. The middle scheme comprises correlation of the data in the pixels above and below the pixel to be reconstructed and correlation of data between pairs of pixels positioned immediately adjacent to this. A further possible interpolation is evaluated in the left-hand example of FIG. 1 by looking at the correlation between pixels on lines which pass diagonally sloping down to the right through the pixel being reconstructed. The same process with the opposite diagonals is shown in the right-hand example of FIG. 1.

The correlation between the data in the various pairs of pixels can be derived using the sum of absolute differences (SAD) or the mean square error, or other well-known statistical techniques. The sum of absolute differences and the mean square error are derived as follows:

$$SAD = \sum_i |Ytop[i] - Ybot[n-i]|$$

$$MSE = \sum_i (Ytop[i] - Ybot[n-i])^2$$

In the above formulas, Ytop and Ybot represent the luminance of the pixels in the lines above and below the pixel to be reconstructed in a field, and n is the number of pixels in each row. The luminance of a pair of pixels is involved in each single difference.

The graph on the right-hand side of FIG. 1 shows an example of SAD based procedure using five pixels only for each row and three correlations of symmetrically located sets of pixels, each set made up of the three pixel pairs. In practice, more pixels are involved in the computation to ensure greater accuracy. Preferably, between 7 and 30 pixels pairs are used.

If we use the SAD approach to comparing the values of pairs of pixels, then FIG. 1 leads to 3 SAD values. SAD 0, SAD 1 and SAD 2 which are shown graphically at the right-hand side of FIG. 1. This can be considered the correlation curve for the various possible interpolations. In many techniques, the interpolation scheme which gives the smallest difference in SAD or the smallest means square error (MSE) does not always produce the best quality final image. This is because the content of the image in the neighbourhood of the pixel being reconstructed can affect the SAD or MSE. For example, if there are a few thin lines passing close to the pixel to be reconstructed there is a risk that in reconstruction, the lines result in pixelation or flickering in the final image. In U.S. Pat. No. 6,133,957 and GB 2402288 this problem has been addressed by blending several relative minima in a correlation curve together and has also been approached by clamping the result using the values generated by the pixels directly above and below the one to be reconstructed. The problem with these approaches is that even though blending and damping reduce the effect of incorrect analysis of the correlation curve, they are affected by the incorrect starting point for the procedure.

We have appreciated that by modifying the correlation curve with an adjustment curve selected in dependence on the form of the correlation curve increases the likelihood of selecting the correct minimum value from the correlation curve. The adjustment curve is selected or altered in dependence on a confidence measure derived from the correlation curve data.

Preferably, the local minima for various portions of the correlation data are detected and the selection of an adjustment curve to combine with the correlation curve to generate ft most likely interpolation scheme to produce good results is made in dependence on the relative positions of minima in the correlation data.

Preferably the correlation data is divided into segments and local minima detected in each segment.

SUMMARY OF THE INVENTION

In accordance with one aspect of the invention there is provided a method for converting an interlaced video signal to a progressive scan video signal comprising the steps of:

for each pixel in each missing line of a video field in a video signal to be converted, providing correlation data for each of a set of possible interpolations between adjacent pixels to be used in reconstructing the missing pixel;

from the correlation data deriving a confidence measure from the correlation data;

determining from the confidence measure the interpolation scheme most likely to produce an accurate missing pixel; and interpolating the missing pixel using he selected interpolation scheme wherein the step of deriving a confidence measure comprises determining the number of maxima and minima in the correlation data and deriving the confidence measure in dependence on the result of the determination.

BRIEF DESCRIPTION OF THE DRAWINGS

A preferred embodiment of the invention will now be described in detail by way of example with reference to the accompanying drawings in which.

DETAILED DESCRIPTION OF PREFERRED EMBODIMENTS

Figure 2:
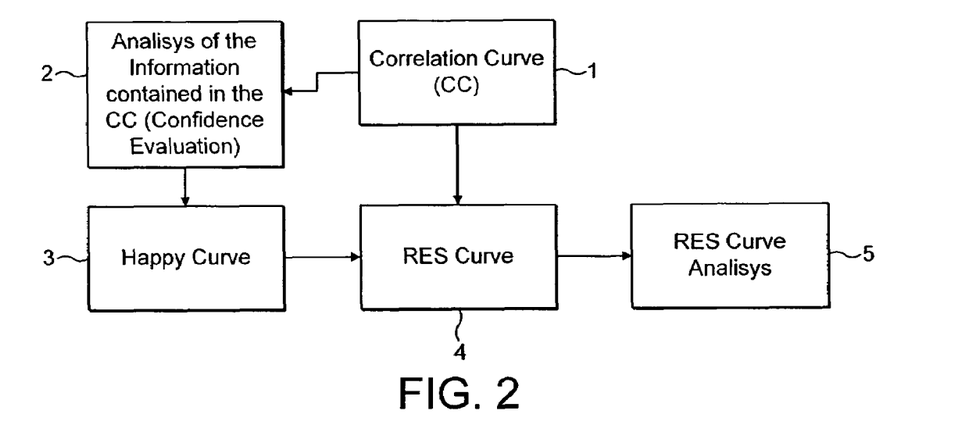
FIG. 2 shows a block diagram of the processes which have to take place in an embodiment of the invention.

The diagram of FIG. 2 is now explained with reference to the 5 pixel interpolation schemes shown in FIG. 1. As mentioned above, in practice more pixels than 5 will be used and more interpolation schemes than the 3 shown in FIG. 1 will be used but we refer to these for ease of understanding.

Figure 3:
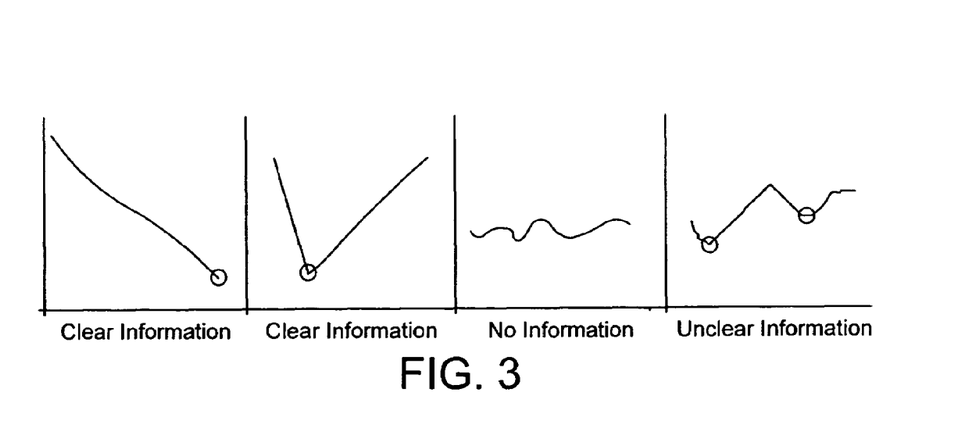
FIG. 3 shows a number of different examples of correlation curves which might be obtained.

In FIG. 2, unit 1 performs the derivation of correlation data for the correlation curve shown in FIG. 1. In this example 3 points are used. In practice, the number of points used will be proportional to the number of pixels used. In unit 2, an analysis of the information contained in the correlation curve is performed to produce a confidence evaluation for the curve in the form of confidence data. This comprises a measure as to the clarity of the information contained in the correlation data. Examples of the type of correlation curve which can be generated with the correlation data are shown in FIG. 3. The two left-hand side curves have clear maxima and a single minimum each. Thus, it is highly likely that the minimum value created by the SAD of FIG. 1 from the various sets of pairs of pixels is the correct minimum to use and therefore the correct set of pairs of pixels to use for the interpolation of the pixel of a missing line. The third curve of FIG. 3 has three minima and 3 maxima. Therefore the data for this graph gives no indication as to which of the minima detected is the most relevant.

The fourth example in FIG. 3 gives a curve with 2 distinct minima. Either of these could be the correct one to use in determining the interpolation scheme to use. However, they are physically separated by a number of pixels and therefore it is unclear which of them should be used.

In FIG. 2, the correlation data is generated in a logical sequence, for example in FIG. 1 starting with the left-hand interpolation scheme and moving to the right. Whatever the scheme adopted, a logical sequence is required so that there is an incremental change in the relative positions of the pixels being used by the interpolation scheme. In graphical representation, this would mean, for example, when looking at the graph on the right-hand side of FIG. 1, the first SAD point plotted is that generated by the pixels selected in the left-hand side scheme of FIG. 1 i.e. the diagonal line joining the pixels slope downwards to the right through the pixel to be reconstructed. For the middle point, the lines joining the pairs of pixels are vertical and for point 2 the lines joining the pairs of pixels slope upwards to the right. A similar type of approach is taken whatever number of pixels or whatever interpolation scheme is used.

In the confidence evaluation stage of FIG. 2, the SAD measurements from FIG. 1 are received in turn from correlation analysis in unit 1. The data as it is received is compared with previous data to determine where local minima occur.

Figure 4:
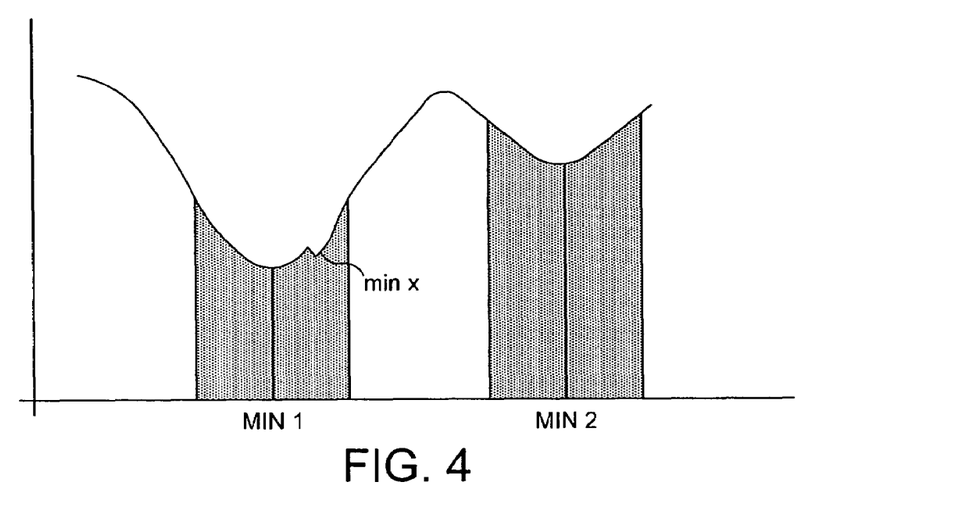
FIG. 4 shows diagrammatically how a correlation curve is analysed.

An example of this is shown in FIG. 4 for a curve which has 2 statistically significant minima MIN 1 and MIN 2. There is also a minimum min x which is ignored as it's size in proportion to the rest of the curve is insignificant. The confidence evaluation unit 2 determines a confidence measure representing whether the correlation data is likely to produce the correct result for the interpolation scheme to be used and then uses this to select an adjustment data which is combined with the data for each point on the correlation curve. The confidence measure is supplied to adjustment curve unit 3 which selects the adjustment data to use in dependence on the output of the confidence evaluation unit 2 and supplies the data for this curve to a combination unit 4 which combines it with a correlation data from the correlation curve unit 1. The resultant data is then sent to a resultant data analysis unit 5 which can select the appropriate minimum from the resultant data and from this determine which interpolation system (see FIG. 1) should be used in interpolating the missing pixel.

Figure 5:
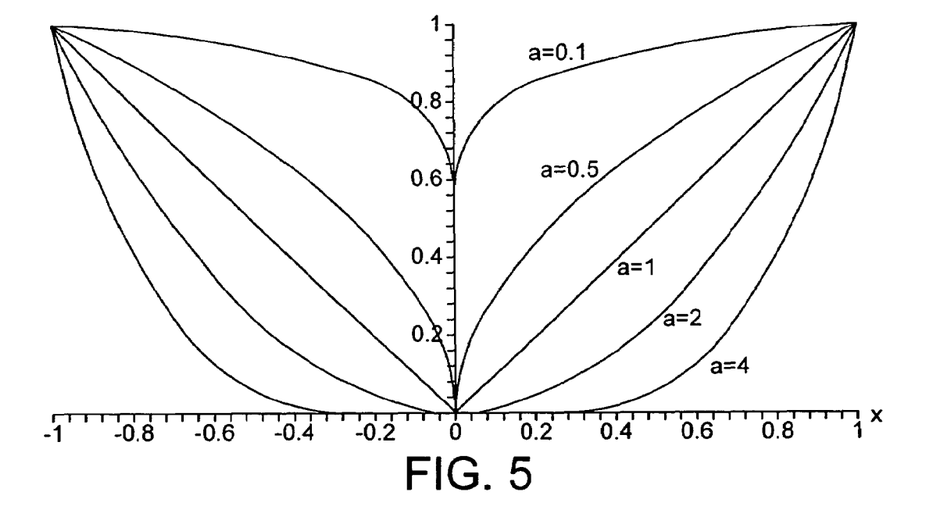
FIG. 5 shows examples of the curves which might be combined with the correlation curve.

The selection of data represented by a curve which might be used by the adjustment curve analysis unit 3 of FIG. 2 is shown in FIG. 5. These are produced by the equation:

$$F(x) = b * |x|^a$$

In this formula b is a parameter which is adjusted in dependence on the confidence evaluation derived from the confidence evaluation unit 2 i.e. the confidence measure. a is either a constant in the preferred embodiment or can be related to the confidence measure as well. x relates to the position of the interpolation scheme to which the confidence evaluation relates in the logical sequence of interpolation schemes.

Figure 6:
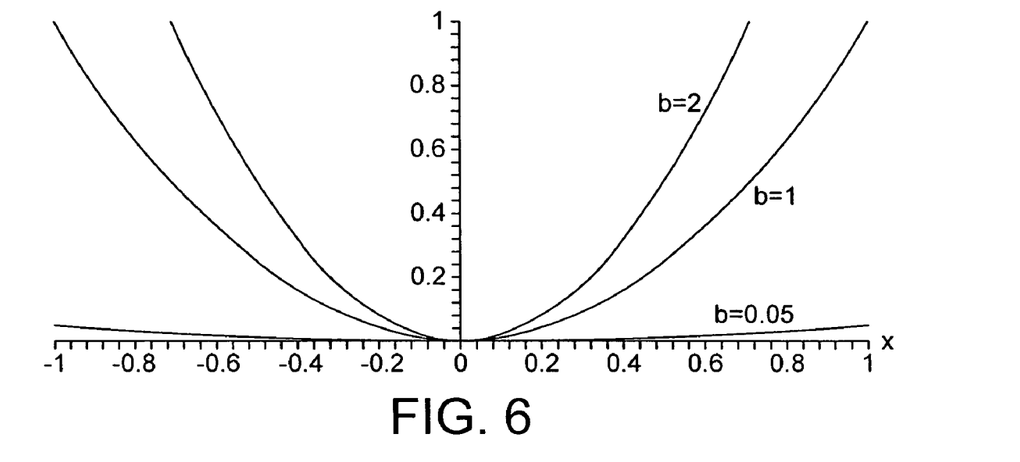
FIG. 6 is a graph which shows how the sensitivity of the curves of FIG. 5 to an additional factor.

FIG. 5 shows various different curves for different values of a with a value of b equal to 1. Although all of these could deliver good performance in specific cases, we have appreciated that the best overall curve in dealing with many situations is produced by a curve with a fixed value of a equals to 2. Because this exponential value is relatively low, the continuity of the first derivative b is more significant. Examples of this curve for various values of b are shown in FIG. 6. Thus it can be seen that as b increases, the steepness of the curve increases.

The zero value of the curve is in the centre of the graph of FIG. 6 and FIG. 5. This corresponds to the centre position of the logical incremental interpolation schemes. In FIG. 1 this would be a central interpolation scheme with the pairs of pixels being positioned vertically with respect to the pixel to be reconstructed.

Figure 7:
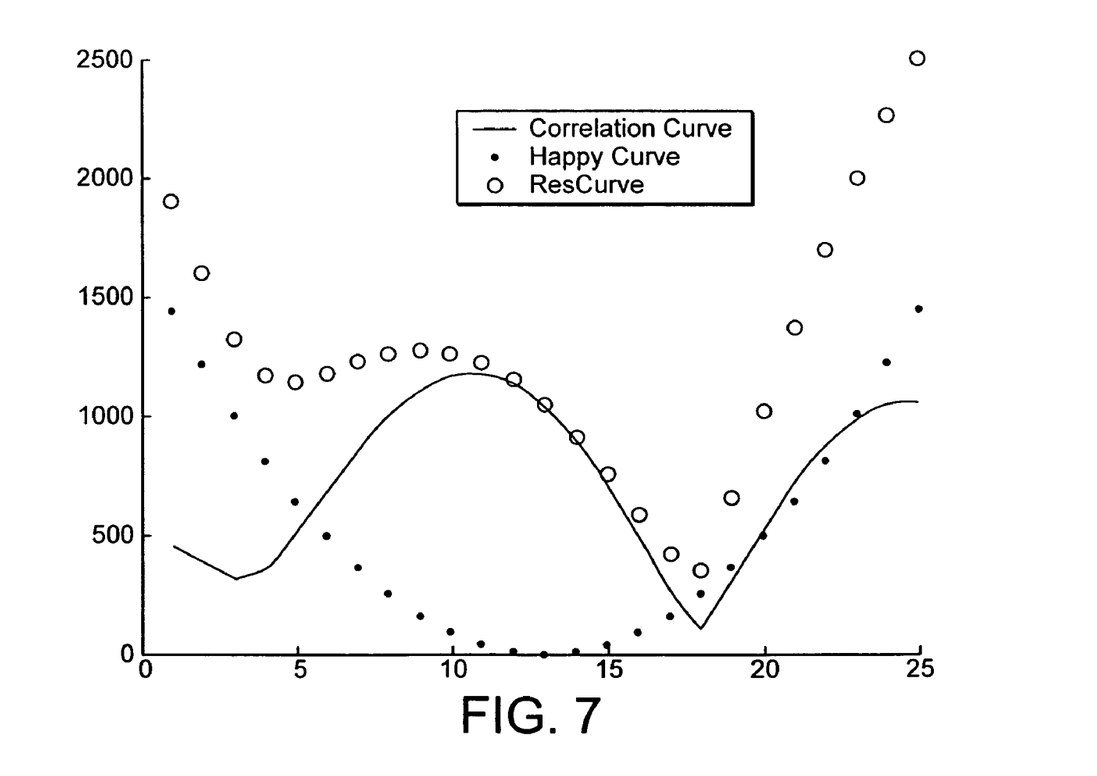
FIG. 7 shows an example of a resultant curve after combination with of one of the curves of FIG. 5.

The curve selected in dependence on the confidence measure b is then passed to the resultant curve generation unit for which combines the data from the curve with the data from the correlation curve unit 1 to produce data for a resultant curve. This is fed to a resultant curve analysis unit 5 which looks for any minima in the resultant curve. An example of a resultant curve and the components of which it is formed is shown in FIG. 7. As can be seen, a correlation curve with 2 minima which are physically separate after combination with an adjustment curve selected in accordance with a confidence measure derived from the correlation curve produces a resultant curve with one minimum much lower than the other. Thus, the position of this minimum is used to select the interpolation scheme to be used to generate the pixel. This process is performed in turn for each pixel to be interpolated on each line of each field of an input video sequence.

Figure 8:
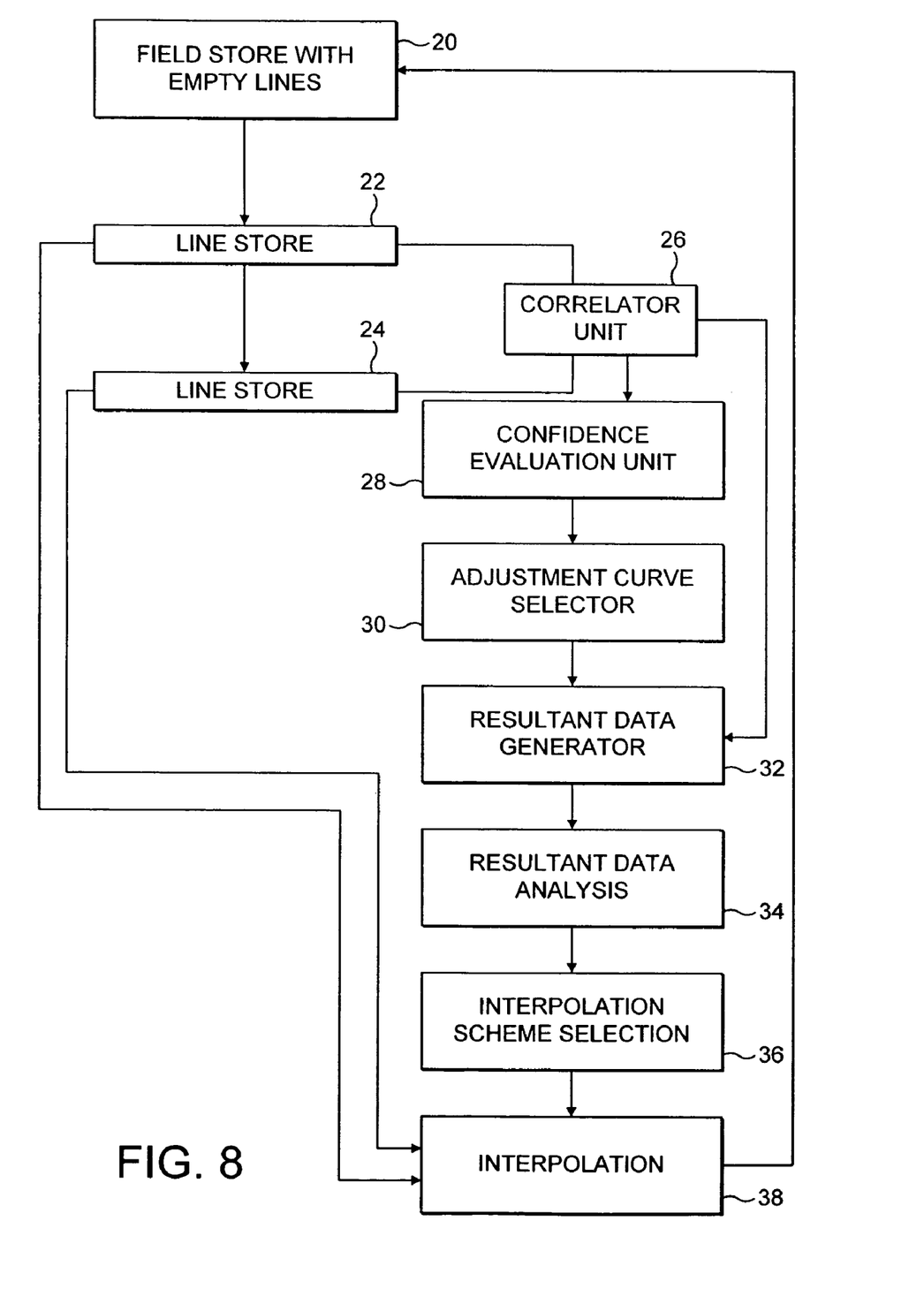
FIG. 8 shows a block diagram of an embodiment of the invention.

A more detailed block diagram of an example of a system embodying the invention is shown in FIG. 8. This comprises a field store 20 to which a field of a new video signal being converted from an interlaced video signal to a progressive scan video signal is stored. From this, each line of the field is read out in turn to line stores 22 and 24. Preferably, a first line is read to line store 22 and then passed to line store 24. At the same time, the next line which will be used with the first line for generating the missing lines of the field in the field store is read to line store 22. The system then analyses the lines to select the best interpolation schemes are used for each pixel in turn before passing the line stored in line store 22 to line store 24 and reading the next line of the field from the field store 20 to the line store 22.

Once 2 lines are stored in line stores 22 and 24 a correlation unit 26 produces, for each pixel in turn to be generated for the line position between the two lines in the line stores 22 and 24, a series of correlations in logical order for the different possible interpolation schemes to be used in generating that pixel. At the ends of the lines, not all the possible interpolations will be available. The correlation unit 26 calculates for example a sum of absolute differences or a least means squared analysis of the correlation between different pairs of pixels to be used in each of the interpolation schemes. The sums of absolute differences are provided in turn for each pixel to a confidence evaluation unit 28. When all the values from the correlation unit 26 have been added to the confidence evaluation unit 28 a confidence value is generated. This is related to the positions and numbers of local minima for the correlation values produced by the correlation unit 26.

This confidence value is then provided to an adjustment curve selector 30 which uses it to modify a predetermined adjustment curve. In its most straightforward form the confidence value is used as a multiplier on the adjustment curve. More complex schemes can be used. Alternatively, the confidence value can be used to select between a plurality of predefined adjustment curves.

The data representing the adjustment curve is then provided from the adjustment curve selector 30 to a resultant data generation unit 32. Here the data from the adjustment curve is combined with the data from the correlation unit 26. For curves where the correlation data for a pixel which has 2 or more minima, the resultant data generation unit 32 should by combining correlation data with the adjustment curve data produce a set of adjusted correlation data which has a clear minimum value. This clear minimum value is then detected in a resultant data analysis unit 34. This provides data about the correlation value for a pixel which gives the minimum adjusted value. In dependence on this, an interpolation scheme selector 36 selects an interpolation scheme to be used to generate the pixel in question. The data for that interpolation is then provided either from the line stores 22 and 24 or from the field store 20 to an interpolator 38 which generates the value for the missing pixel. The system then proceeds to the next of the missing pixels to be generated until all missing pixels between the lines in the 2 line stores have been generated. The system then moves the pixel data from line store 22 to line store 24 and reads in the next available line from the field store 20. This continues until the missing lines for the whole field have been generated and the data is available for display.

Preferably the process takes place in real time so that it can be performed on a video signal being received by a television receiver which converts the signal to a non-interlaced form ready for display.

In an improvement on the arrangement of FIG. 8, two or more sets of the hardware of FIG. 8 could be provided operating in parallel in different lines of the field store 20 to improve processing speed.

In an alternative, the system of the FIG. 8 can be implemented in a dedicated processor. Two or more of these can be provided in parallel to improve the speed of processing. One possibility is to have a processor available for each of the missing lines of the field stored in the field store 20 to minimise processing time. This of course would make the unit more expensive.

For certain pixels to be generated, the resultant data analysis unit 34 may generate data which remains unclear. In such a situation, some form of exception processing is provided. This could involve using a different adjustment curve to improve the quality of the resultant data output. Other schemes are possible.

One further area where significant improvement in the reliability of the correct pixels being interpolated in missing lines is the confidence with which analysed correlation data can produce to a significant result. This confidence is used in the example given above to generate a confidence measure which can be used to select adjustment data to combine with the correlation data to produce a set of resultant data from which the correlation scheme most likely to produce the correct result for the pixel to be interpolated is selected. Confidence measures can be used in other methods of selecting interpolation schemes.

We have devised a procedure for examining the correlation data to improve the reliability of the selection of interpolation schemes which can be used in combination with the adjustment data discussed above, or can be used in other methods.

For example, if the confidence measure is above a predetermined value then it could be deemed to be sufficiently accurate for no adjustment to correlation data to be required and for the interpolation data to be required and for the interpolation scheme to be selected directly from the correlation data. If the confidence measure is below a predetermined value then it could be used in combination with the adjustment data discussed above or in some other scheme.

In order to produce a confidence measure from the correlation data, the first stop is to extract the topology of points from the correlation data. This is shown with regard to the graphs of FIGS. 2 and 3. The top example in FIG. 2 shows a reasonably smooth correlation curve with a maximum close to one end and a minimum approximately two-thirds of the way along the line. The significant points of this curve are selected in the central graph to give the resultant set of the data points on the right-hand side.

Figure 9:
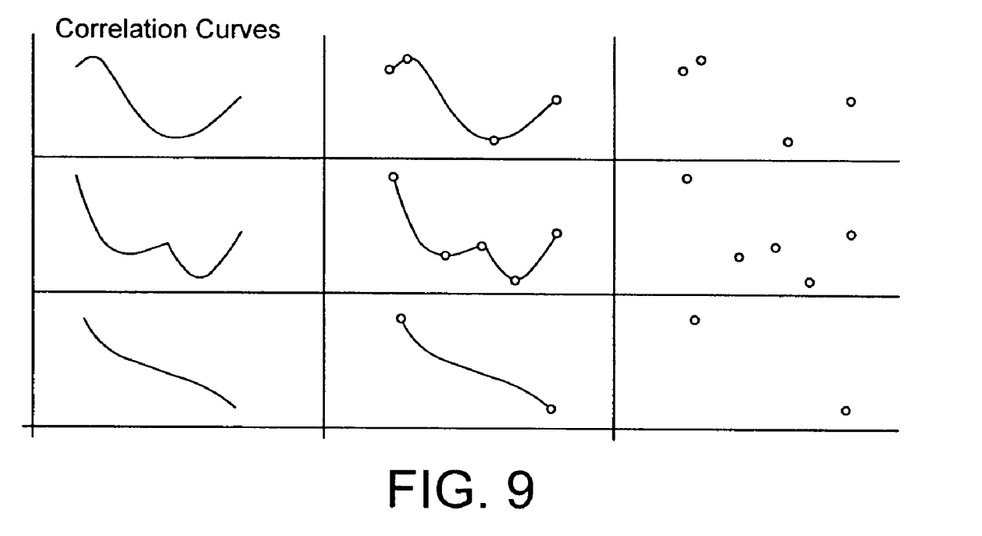
FIG. 9 shows three different correlation curves and the topological data which is extracted from them.

A more complex graph is shown from the central line of FIG. 9. This has two distinct minima at slightly different levels with a local maximum between them. A set of data points derived from this is shown on the right-hand side.

The bottom example is the most straightforward and starts from a maximum on the left-hand side decreasing reasonably smoothly to a minimum on the right-hand side. This can be shown with only two data points.

These data points generated now form an array of output data which comprises three elements namely:

value of the relative extremes (relative maximum or minimum) as an integer value;

position of the relative extremes (as an index in the correlation data); and, a flag indicating whether the extreme is a relative maximum or minimum.

Figure 10:
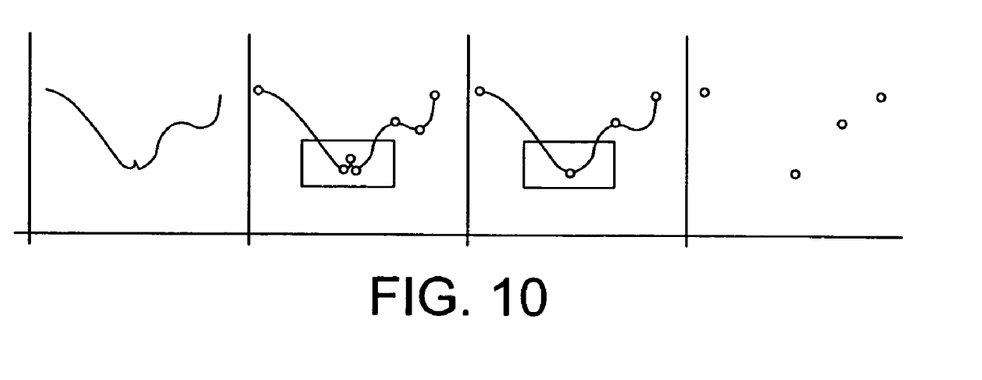
FIG. 10 shows how a correlation curve can be cleansed to remove small local maxima or minima.

An important additional step is shown in relation to FIG. 10. This comprises what we refer to as cleaning the data. This is necessary to prevent the subsequent procedure from analysing extremes which are not significant when reconstructing the general shape or topology of the correlation data. It eliminates those maxima and minima which are too close to each other. As can be seen in FIG. 10, the curve representing the correlation data has a local maximum close to the minimum value of the curve. Analysis of this by a cleaning procedure removes the local maximum leaving the two local minima and the local maximum represented by a single point in the topology.

Figure 11:
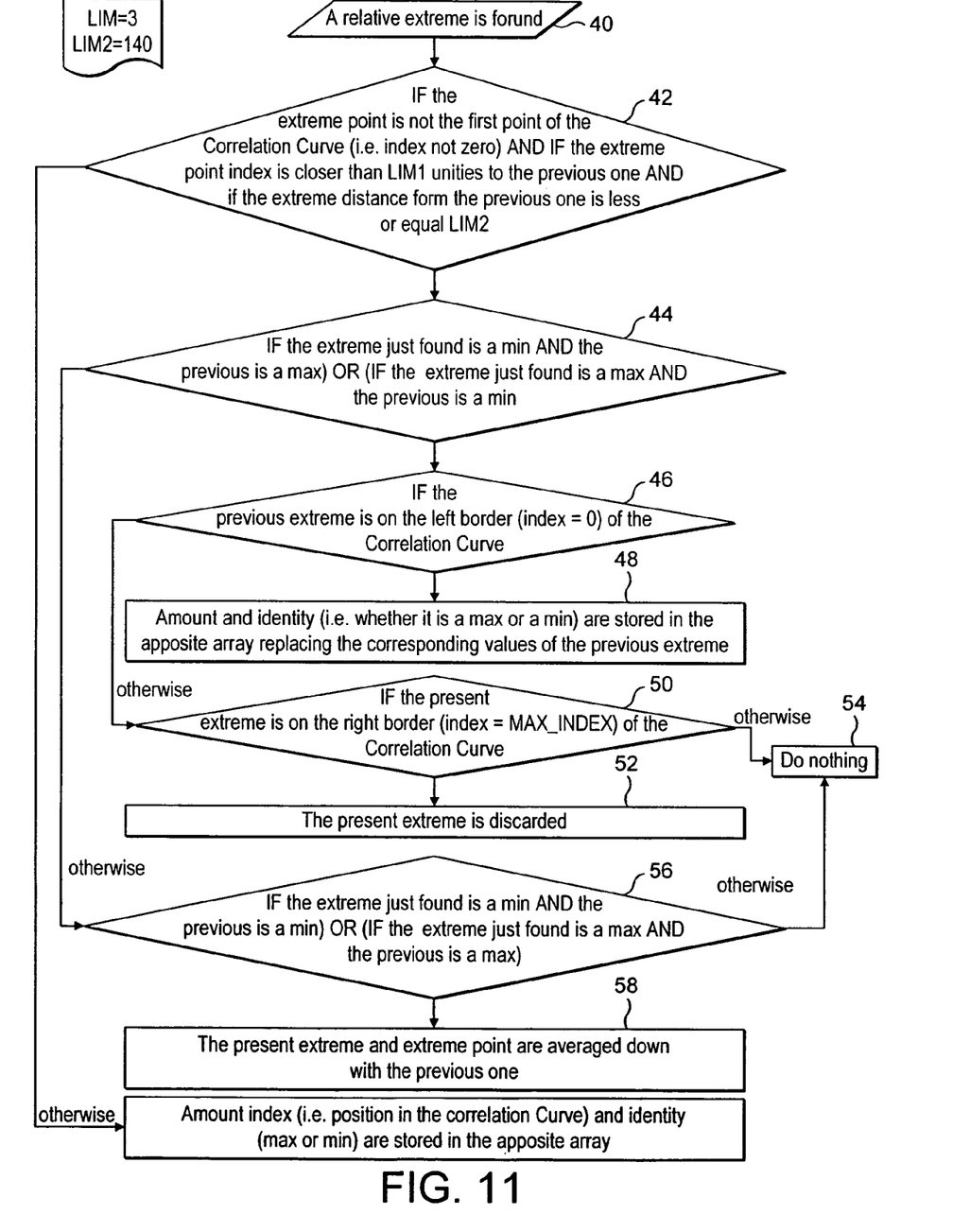
FIG. 11 is a flow diagram showing the procedure for detecting maxima and minima.

The procedure for cleaning the correlation data is now described in relation to FIG. 11.

Initially at 40 a relative extreme is found (maximum or minimum). Then, at 42 a determination is made as to whether or not the extreme is the first point of correlation data or the last point, corresponding to the first and last interpolation schemes which could be used. If it is not the procedure goes to stop 44. If it is, then the procedure skips directly to the end and the position in the correlation curve and whether or not it is a maximum or minimum are stored in a data array.

If the extreme is at some other point on the curve, then at 44, if the extreme found is a minimum and the previous extreme is a maximum, or if the extreme just found is a maximum and the previous is a minimum then the procedure passes to 46. This determines whether or not the extreme was on the left border of the correlation curve. If it was, then the amount and identity (maximum or minimum) of the new extreme are stored in a data array replacing the corresponding values of the previous extreme. If the previous extreme is not on the left border at 46 then the procedure passes to 50. If determination is made as to whether or not the present extreme is on the right-hand border, i.e. is the last extreme in the correlation curve. If it is, then the present extreme is discarded at 52. Otherwise nothing changes as at 54. If the result from 44 was that the extreme found was a minimum and the previous had not been a maximum or if the extreme found had been a maximum and the previous extreme had not been a minimum then the procedure passes to 56. A determination is made as to whether or not the extreme just found is a minimum and the previous extreme is a minimum, or if the extreme just found is a maximum and the previous is a maximum. If neither is the case then the procedure does nothing at 54. If it is the case, then the present extreme and the new extreme are averaged.

Figure 12:
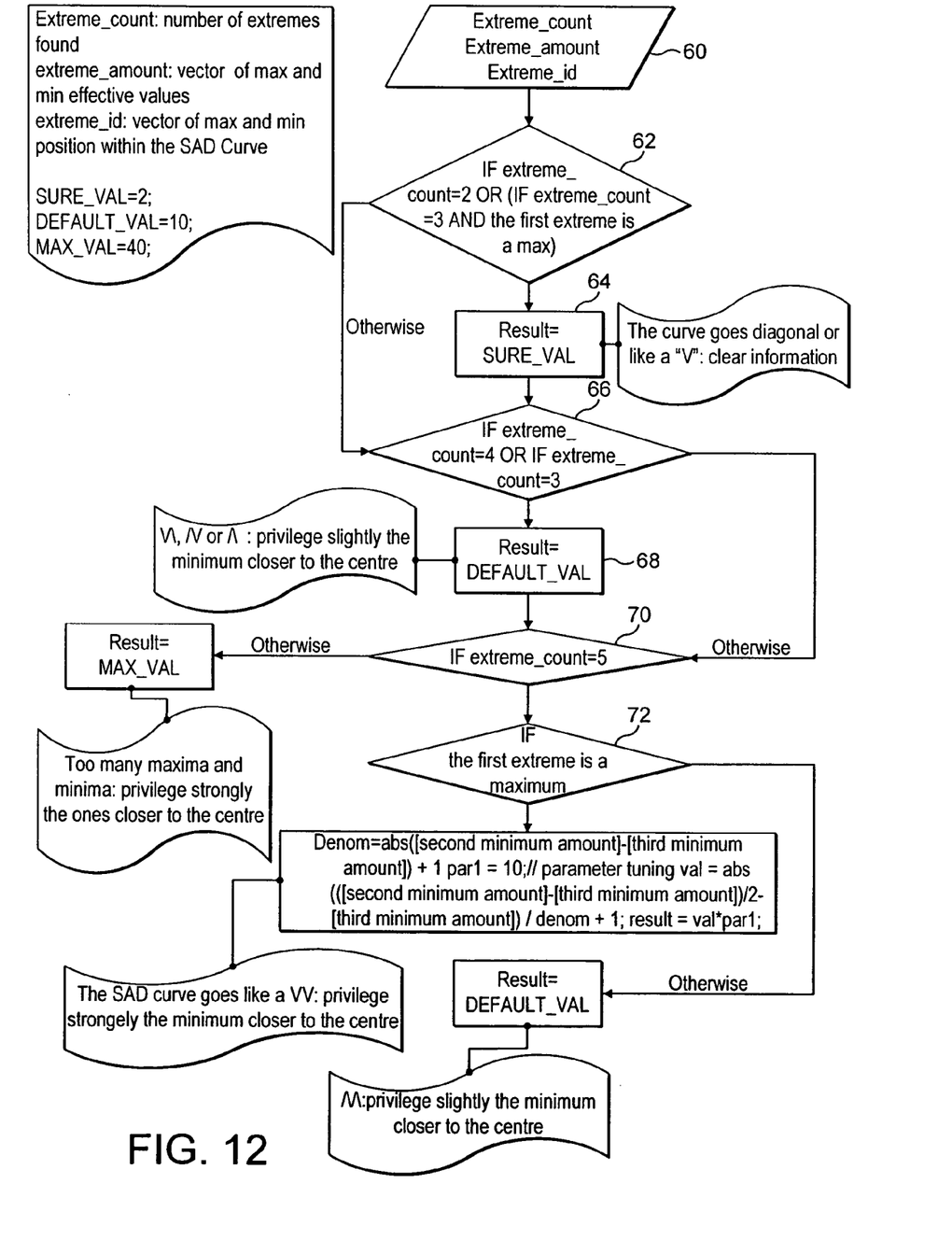
FIG. 12 is a flow diagram showing the procedure for deriving a confidence measure from the information about extremes extracted by the procedure of FIG. 11.

Once the correlation data has been checked and cleaned to eliminate any extremes which are too close together, the data is passed to a processor which performs the procedure set forth in FIG. 12. The purpose of this is to examine the values of the data within the topology array and in response to this to return a value which gives an indication of the confidence of the correlation data being able to be used to select the correct interpolation scheme for reconstruction of a pixel in a missing line. This confidence measure is generated for each pixel in turn in a missing line, and for each missing line.

The example of FIG. 12 uses three data values in determining the confidence measure to use. These are extreme count which is an integer value of the number of extremes but its maxima and minima found in the cleansed correlation data, extreme amount which is the magnitude of each maximum and minimum in the correlation data, and extreme ID which is a value representing the position of each maximum and minimum in the data. These values are selected from a cleansed correlation data array at 60.

At 62, a determination is made as to whether or not the extreme count value is 2 or 3 (with the first extreme being a maximum). If it is, then the curve is either a general diagonal line or a general V indicating that the minimum correlation value is relatively clear. Therefore at 64 the result is set to Sure-Val representing a high degree confidence in the correlation data. If the extreme count is not 2 or 3 then the procedure passes to 66. This determines whether the extreme count is 4 or 3 (for data where the first extreme is a minimum). If it is, then a default value Default-Val is set as a result at 68. This represents a lower degree of confidence in the ability of the correlation data to be used to select the correct interpolation scheme.

If the extreme count is not 4 or 3 then the procedure passes to 70 which determines whether or not the extreme count is 5. If it is, then if the first extreme is determined to be a maximum at 72 then the equation shown at 74 is performed on the correlation data corresponding to the maxima and minima to derive a confidence value. If the extreme count at 70 is determined not to be 5, then it is greater than 5, a result is set to be a value called Max-Val. This indicates that there are too many maxima and minima in the correlation data and that the minima closer to the centre, i.e. the position of the pixel to be reconstructed should be emphasised.

If at 72 the first extreme is not a maximum, then the result is set to be Default-Val as was done at 68 indicating that some emphasis should be given to the new one closer to the centre point but not so much as with max under par val.

Using the value Sure-Val, Default-Val and Max-Val, different values to be given to the parameter b used in the selection of adjustment data as shown in FIG. 6. So, Sur-Val could correspond to a value of b 0.05, default val to a value of b of 1 and max val to a value of b of 2. Thus curves with more maxima and minima will receive more adjustment than those with fewer maxima and minima. The values can also be used in other schemes for selecting interpolations to be used when reconstructing a missing pixel.

The procedures shown in FIG. 12 can be extended to look for cleansed correlation data with more maxima and minima and therefore have more values of the confidence measure to be provided. The procedure can be modified to take account of the relative size of the relative maxima or minima and their proximity in determining which one is most likely to be useful in indicating the correct interpolation scheme to use.

The invention claimed is:

1. A method for converting an interlaced video signal to a progressive scan video signal comprising the steps of:
 for each pixel in each missing line of a video field in a video signal to be converted, providing correlation data for each of a set of possible interpolations between adjacent pixels to be used in reconstructing the missing pixel;
 deriving a confidence measure from the correlation data;
 determining from the confidence measure the interpolation scheme most likely to produce an accurate missing pixel; and
 interpolating the missing pixel using the selected interpolation scheme
 wherein the step of deriving a confidence measure comprises determining the number of maxima and minima in the correlation data and deriving the confidence measure in dependence on the number of maxima and minima so determined.

2. A method according to claim 1 in which the step of determining the confidence measure including the step of determining the relative positions of the pixels from which each correlation was made and using this in deriving the confidence measure.

3. A method according to claim 1 including the step of selecting adjustment data for the correlation data from the confidence measure and adjusting the correlation data with adjustment data.

4. A method according to claim 3 in which the step of determining the interpolation scheme does so in dependence on the adjustment data.

5. Apparatus for converting an interlaced video signal to a progressive scan video signal comprising:
 means for each pixel in each missing line of a video field in a video signal to be converted which provides correlation data for each set of possible interpolations between adjacent pixels to the pixel to be reconstructed;
 means for deriving a confidence measure from the correlation data;
 means for determining from the confidence measure the interpolation scheme most likely to produce an accurate missing pixel; and
 means for interpolating a missing pixel using the selected interpolation scheme;
 wherein the means for deriving a confidence measure comprises means for determining the number of maxima and minima in the correlation data and means for deriving the confidence measure in dependence thereon.

6. Apparatus according to claim 5 in which the means for deriving a confidence measure also includes means for determining the relative positions from the pixels from which each correlation was made and means for deriving the confidence measure therefrom.

7. Apparatus according to claim 5 including means for selecting adjustment data for the correlation data from the confidence measure and means for adjusting the correlation data with the adjustment data.

8. Apparatus according to claim 7 in which the means for determining the interpolation scheme does so in dependence on the adjusted correlation data.

9. A method according to claim 2 including the step of selecting adjustment data for the correlation data from the confidence measure and adjusting the correlation data with adjustment data.

10. A method according to claim 9 in which the step of determining the interpolation scheme does so in dependence on the adjustment data.

11. Apparatus according to claim 6 including means for selecting adjustment data for the correlation data from the confidence measure and means for adjusting the correlation data with the adjustment data.

12. Apparatus according to claim 11 in which the means for determining the interpolation scheme does so in dependence on the adjusted correlation data.

* * * * *